United States Patent
Kawamura et al.

(10) Patent No.: US 7,699,748 B2
(45) Date of Patent: Apr. 20, 2010

(54) LINE PRESSURE CONTROL APPARATUS AND LINE PRESSURE CONTROL METHOD FOR AUTOMATIC TRANSMISSION

(75) Inventors: Tatsuya Kawamura, Toyota (JP); Toshio Sugimura, Nagoya (JP); Satoshi Ishida, Kitanagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 408 days.

(21) Appl. No.: 11/640,274

(22) Filed: Dec. 18, 2006

(65) Prior Publication Data

US 2007/0142173 A1    Jun. 21, 2007

(30) Foreign Application Priority Data

Dec. 21, 2005    (JP)    ............... 2005-368210

(51) Int. Cl.
*B60W 10/00*    (2006.01)
*F16H 61/00*    (2006.01)
(52) U.S. Cl. ...................................... 477/70; 477/160
(58) Field of Classification Search ............... 477/62, 477/70, 158, 159, 160, 161, 162, 163
See application file for complete search history.

(56) References Cited

U.S. PATENT DOCUMENTS

| | | | | |
|---|---|---|---|---|
| 4,836,055 A | * | 6/1989 | Suzuki | .................. 477/61 |
| 5,107,723 A | * | 4/1992 | Yamashita et al. | ........... 477/117 |
| 6,471,613 B1 | * | 10/2002 | Botosan et al. | .............. 475/120 |
| 7,164,981 B2 | * | 1/2007 | Kim | ............................. 701/51 |
| 7,485,062 B2 | * | 2/2009 | Botosan et al. | .............. 475/127 |
| 2007/0142991 A1 | * | 6/2007 | Kawamura et al. | ............ 701/62 |

FOREIGN PATENT DOCUMENTS

| | | |
|---|---|---|
| JP | 02-038752 A | 2/1990 |
| JP | 05-052258 A | 3/1993 |
| JP | 5-118417 A | 5/1993 |
| JP | 5-223166 A | 8/1993 |
| JP | 05-223166 A | 8/1993 |
| JP | 08-200489 A | 8/1996 |
| JP | 11-201269 A | 7/1999 |
| KR | 10-2003-0034935 A | 5/2003 |
| KR | 10-2004-0050297 A | 6/2004 |
| KR | 10-2005-0053414 A | 6/2005 |

* cited by examiner

*Primary Examiner*—Dirk Wright
(74) *Attorney, Agent, or Firm*—Sughrue Mion, PLLC

(57) ABSTRACT

An ECU executes a program that includes the steps of setting a line pressure to a line pressure (1) that is appropriate for improving fuel efficiency, if an automatic transmission is not shifting, and a deceleration slip control for a lock-up clutch is not being executed; setting the line pressure to a line pressure (2) that is equal to or lower than a line pressure (3) that is appropriate when the automatic transmission is shifting, if it is determined that the automatic transmission is not shifting, and the deceleration slip control is being executed; and setting the line pressure to the line pressure (3), if it is determined that the automatic transmission is shifting. The line pressure (1) is lower than the line pressure (2). The line pressure (2) is equal to or lower than the line pressure (3).

13 Claims, 8 Drawing Sheets

|      | C1 | C2 | B1 | B2 | B3 | F |
|------|----|----|----|----|----|---|
| 1ST  | ○  | ×  | ×  | ◎  | ×  | △ |
| 2ND  | ○  | ×  | ○  | ×  | ×  | × |
| 3RD  | ○  | ×  | ×  | ×  | ○  | × |
| 4TH  | ○  | ○  | ×  | ×  | ×  | × |
| 5TH  | ×  | ○  | ×  | ×  | ○  | × |
| 6TH  | ×  | ○  | ○  | ×  | ×  | × |
| R    | ×  | ×  | ×  | ○  | ○  | × |
| N    | ×  | ×  | ×  | ×  | ×  | × |

○ ENGAGED
× DISENGAGED
◎ ENGAGED WHEN ENGINE BRAKE IS APPLIED
△ ENGAGED ONLY WHEN ENGINE DRIVES AUTOMATIC TRANSMISSION

LINE PRESSURE CONTROL APPARATUS AND LINE PRESSURE CONTROL METHOD FOR AUTOMATIC TRANSMISSION

INCORPORATION BY REFERENCE

The disclosure of Japanese Patent Application No. 2005-368210 filed on Dec. 21, 2005, including the specification, drawings and abstract is incorporated herein by reference in its entirety.

BACKGROUND OF THE INVENTION

1. Field of the Invention

The invention relates to a line pressure control apparatus, and a line pressure control method for an automatic transmission. More particularly, the invention relates to an apparatus and a method that controls a line pressure when a slip control for a lock-up clutch is being executed.

2. Description of the Related Art

In general, an automatic transmission includes a torque converter and a gear transmission mechanism. By selectively operating a plurality of frictional engagement elements such as clutches and brakes, a power transmission passage is switched in the gear transmission mechanism so that a predetermined gear ratio is automatically selected. In such an automatic transmission, a hydraulic circuit is provided to control the supply/discharge of the hydraulic pressure to/from actuators for the frictional engagement elements. More specifically, in the hydraulic circuit, a regulator valve is provided, and various other valves, such as a manual valve and a shift valve, are provided downstream of the regulator valve. The regulator valve regulates the hydraulic pressure discharged from an oil pump driven by an engine, to a predetermined line pressure.

In such an automatic transmission, excess hydraulic oil discharged from the regulator valve is supplied to the sliding portion of the gear transmission mechanism as lubricating oil. Japanese Patent Application Publication No. JP-A-5-118417 describes a control unit that avoids the lack of lubricating oil. The control unit receives a signal from a throttle-valve opening amount sensor that detects the opening amount of a throttle valve, a signal from an idle switch that determines whether the throttle valve is completely closed, and a signal from an oil-temperature sensor that detects the temperature of hydraulic oil. Thus, the control unit controls the line pressure using a duty solenoid valve provided in a hydraulic circuit. If a predetermine condition is satisfied when the temperature of hydraulic oil is high, the control unit decreases the line pressure.

FIG. 6 in Japanese Patent Application Publication No. JP-A-5-118417 shows that the line pressure for the automatic transmission is set to different values when the shift is being performed, and when the shift is not being performed. When the downshift is performed while the accelerator pedal is released, the rotational speed of the input shaft of the gear transmission mechanism needs to be increased by the hydraulic pressure for the frictional engagement elements. Therefore, the line pressure needs to be set to a high pressure to perform the shift. If the line pressure is set to a high pressure, fuel efficiency deteriorates. Accordingly, it is determined whether the shift is being performed. When the shift is not being performed, the line pressure is set to a low pressure, as compared to when the shift is being performed. This may improve fuel efficiency during idling.

In a known technology, when controlling the lock-up clutch that directly connects the input side to the output side of the torque converter, a feedback control (slip control) is executed to adjust the engagement force for the lock-up clutch to a predetermined value according to the difference between the rotational speed of a pump on an input-side (that corresponds to an engine speed) and the rotational speed of a turbine (that corresponds to the rotational speed of the input shaft of the automatic transmission). Thus, the slip state of the lock-up clutch of the torque converter is appropriately controlled to prevent vibrations and noise, and to improve fuel efficiency. That is, the slip control for the lock-up clutch is executed when fuel supply is cutoff to improve fuel efficiency during deceleration of a vehicle. When the shift is performed while the deceleration slip control is being executed, the line pressure is increased for the reason described above. The hydraulic circuit is configured to execute the slip control for the lock-up clutch using the line pressure as an original pressure. Therefore, when the line pressure is suddenly increased while the slip control is being executed, the lock-up clutch is engaged, and a shift shock occurs.

However, Japanese Patent Application Publication No. JP-A-5-118417 does not describe the line pressure used for executing the slip control for the lock-up clutch.

SUMMARY OF THE INVENTION

The invention provides a line pressure control apparatus and a line pressure control method for an automatic transmission, which suppress a shift shock when the automatic transmission shifts while a slip control for a lock-up clutch is being executed.

A first aspect of the invention relates to a line pressure control apparatus for an automatic transmission that includes a lock-up clutch. The line pressure control apparatus includes a first determination device, a second determination device, and a setting device. The first determination device determines whether the automatic transmission is shifting. The second determination device determines whether a slip control for the lock-up clutch is being executed while a vehicle is decelerated by releasing an accelerator pedal. If the first determination device determines that the automatic transmission is shifting, the setting device sets a line pressure to a first value that is higher than a second value. If the first determination device determines that the automatic transmission is not shifting, and the second determination device determines that the slip control is not being executed while the vehicle is decelerated by releasing the accelerator pedal, the setting device sets the line pressure to the second value. If the first determination device determines that the automatic transmission is not shifting, and the second determination device determines that the slip control is being executed while the vehicle is decelerated by releasing the accelerator pedal, the setting device sets the line pressure to a value higher than the second value.

According to the first aspect, when the automatic transmission is shifting, the line pressure is increased. When the line pressure is increased while the slip control is being executed, the lock-up clutch is engaged. Thus, a great shock occurs. Therefore, when the automatic transmission is not shifting, and the slip control is being executed, the line pressure is set to the value that is higher than the low pressure (second value) that is appropriate for improving fuel efficiency. Thus, when the automatic transmission shifts while the slip control for the lock-up clutch is being executed, it is possible to suppress a great change in the line pressure, and to avoid the engagement of the lock-up clutch due to a sudden great change in the line pressure. Therefore, a shift shock can be suppressed. As a result, it is possible to provide the line pressure control apparatus for the automatic transmission, which suppresses a shift shock when the automatic transmission shifts while the slip control for the lock-up clutch is being executed.

In the line pressure control apparatus according to the second aspect of the invention, the setting device includes device that sets the line pressure to a value that is higher than the second value and is lower than the first value, if the first determination device determines that the automatic transmission is not shifting and the second determination device determines that the slip control is being executed while the vehicle is decelerated by releasing the accelerator pedal, in addition to the configuration according to the first aspect.

According to the second aspect, the line pressure is set to the value lower than the first value, if the first determination device determines that the automatic transmission is not shifting and the second determination device determines that the slip control is being executed while the vehicle is decelerated by releasing the accelerator pedal. Therefore, it is possible to suppress the deterioration of fuel efficiency, and to suppress a shift shock.

A third aspect of the invention relates to a line pressure control method for an automatic transmission that includes a lock-up clutch. The line pressure control method includes the steps of determining whether the automatic transmission is shifting; determining whether a slip control for the lock-up clutch is being executed while a vehicle is decelerated by releasing an accelerator pedal; setting the line pressure to a first value that is higher than a second value, if it is determined that the automatic transmission is shifting; setting the line pressure to the second value if it is determined that the automatic transmission is not shifting, and it is determined that the slip control is not being executed while the vehicle is decelerated by releasing the accelerator pedal; and setting the line pressure to a value that is higher than the second value, if it is determined that the automatic transmission is not shifting, and it is determined that the slip control is being executed while the vehicle is decelerated by releasing the accelerator pedal.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Hereinafter, an embodiment of the invention will be described with reference to the drawings. In the following description, the same components are denoted by the same reference numerals, and have the same names and the same functions. Therefore, the detailed description thereof will not be repeated.

Figure 1:
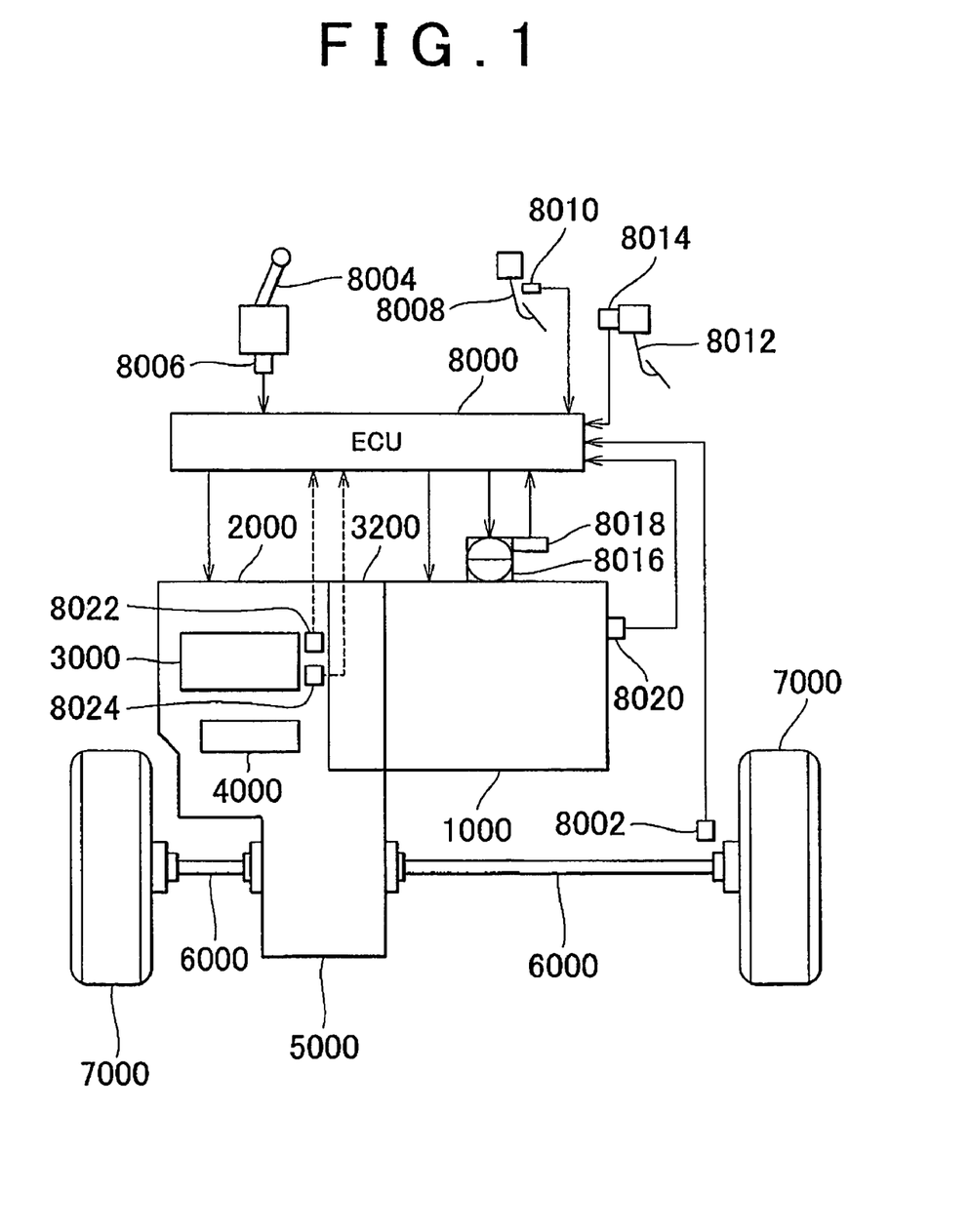
FIG. 1 is a schematic diagram showing a power train controlled by an ECU that is a control apparatus according to an embodiment of the invention.

A vehicle in which a control apparatus according to the embodiment of the invention is provided will be described with reference to FIG. 1. This vehicle is a front engine front drive vehicle. The control apparatus according to the embodiment may be provided in a vehicle other than the front engine front drive vehicle.

The vehicle includes an engine 1000; an automatic transmission 2000; a planetary gear unit 3000 that constitutes a part of the automatic transmission 2000; a hydraulic control device 4000 that constitutes a part of the automatic transmission 2000; a differential gear 5000; a drive shaft 6000; front wheels 7000; and an ECU (Electronic Control Unit) 8000.

The engine 1000 is an internal combustion engine where air-fuel mixture injected from an injector (not shown) is burned in the combustion chamber of a cylinder. By burning the air-fuel mixture, the piston is pushed down in the cylinder, and a crankshaft is rotated.

The automatic transmission 2000 includes a torque converter 3200 that includes a lock-up clutch. The torque converter 3200 of the automatic transmission 2000 is connected to the engine 1000. The automatic transmission 2000 changes the rotational speed of the crankshaft to a desired rotational speed when a desired gear ratio is selected. The lock-up clutch may be completely disengaged, or completely engaged. Alternatively, the lock-up clutch may be placed in a slip state.

The output gear of the automatic transmission 2000 is engaged with the differential gear 5000. The differential gear 5000 is connected to a drive shaft 6000 through spline fitting or the like. Driving force is transmitted to the right and left front wheels 7000 via the drive shaft 6000.

The ECU 8000 is connected to a vehicle-speed sensor 8002, a position switch 8006 for a shift lever 8004, an accelerator-pedal operation amount sensor 8010 for an accelerator pedal 8008, a stroke sensor 8014 for a brake pedal 8012, a throttle-valve opening amount sensor 8018 for an electronic throttle valve 8016, an engine-speed sensor 8020, an input-shaft rotational speed sensor 8022, and an output-shaft rotational speed sensor 8024, via harness or the like.

The vehicle-speed sensor 8002 detects a vehicle speed based on the rotational speed of the drive shaft 6000, and transmits a signal that indicates the result of detection to the ECU 8000. The position switch 8006 detects the position of the shift lever 8004, and transmits a signal that indicates the result of detection to the ECU 8000. The gear ratio of the automatic transmission 2000 is automatically selected according to the position of the shift lever 8004. A manual shift mode may be selected. In the manual shift mode, any gear ratio is selected according to the operation performed by a driver.

The accelerator-pedal operation amount sensor 8010 detects the operation amount of the accelerator pedal 8008, and transmits a signal that indicates the result of detection to the ECU 8000. The stroke sensor 8014 detects the operation amount of the brake pedal 8012, and transmits a signal that indicates the result of detection to the ECU 8000.

The throttle-valve opening amount sensor 8018 detects the opening amount of the electronic throttle valve 8016, which is adjusted by an actuator. Then, the throttle-valve opening amount sensor 8018 transmits a signal that indicates the result of detection to the ECU 8000. The electronic throttle valve 8016 adjusts the amount of air taken into the engine 1000 (i.e., the output of the engine 1000).

The engine-speed sensor 8020 detects the rotational speed of the output shaft (i.e., the crankshaft) of the engine 1000, and transmits a signal that indicates the result of detection to the ECU 8000. The input-shaft rotational speed sensor 8022 detects the rotational speed NI of the input shaft of the automatic transmission 2000, and transmits a signal that indicates the result of detection to the ECU 8000. The output-shaft rotational speed sensor 8024 detects the rotational speed NOUT of the output shaft of the automatic transmission 2000, and transmits a signal that indicates the result of detection to the ECU 8000. The rotational speed NI of the input shaft of the automatic transmission 2000 is the turbine speed NT of the torque convert 3200 that will be described later.

The ECU 8000 controls devices so that the vehicle moves in a desired state, based on the signals transmitted from the vehicle-speed sensor 8002, the position switch 8006, the accelerator-pedal operation amount sensor 8010, the stroke sensor 8014, the throttle-valve opening amount sensor 8018, the engine-speed sensor 8020, the input-shaft rotational speed sensor 8022, the output-shaft rotational speed sensor 8024, and the like, and maps and programs stored in ROM (Read Only Memory).

In the embodiment, when the shift lever 8004 is at a position D (drive), the ECU 8000 controls the automatic transmission 2000 so that any one of the first to sixth gear ratios is automatically selected according to a shift diagram that is separately made. When any one of the first to sixth gear ratios is selected, the automatic transmission 2000 transmits the driving force to the front wheels 7000.

Figure 2:
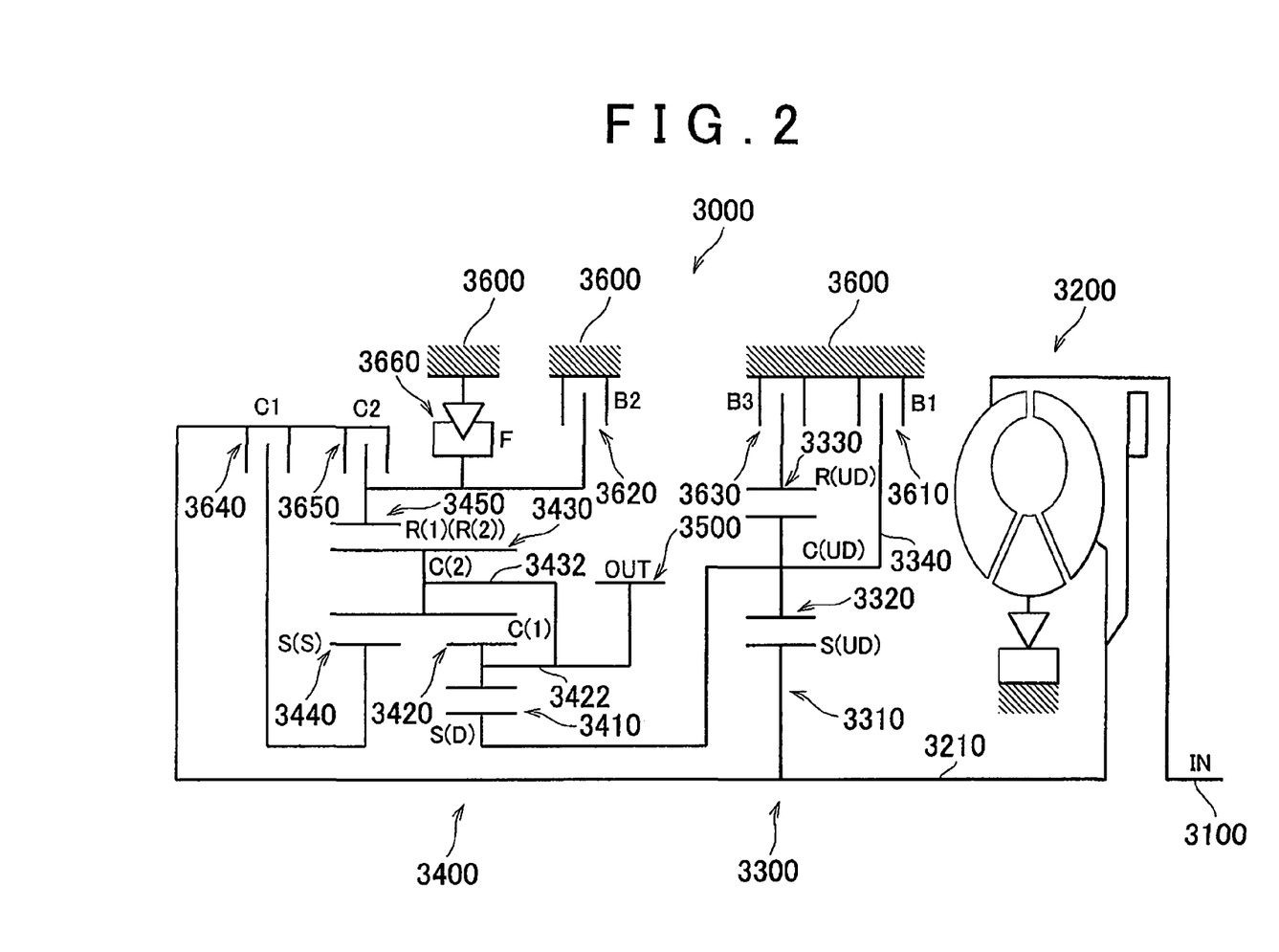
FIG. 2 is a skeleton diagram showing a gear train of an automatic transmission.

As shown in FIG. 2, the planetary gear unit 3000 will be described. The planetary gear unit 3000 is connected to the torque converter 3200 that includes the input shaft 3100 connected to the crankshaft. The planetary gear unit 3000 includes a first set 3300 that is a planetary gear mechanism, a second set 3400 that is another planetary gear mechanism, the output gear 3500, a B1 brake 3610 fixed to a gear case 3600, a B2 brake 3620, a B3 brake 3630, a C1 clutch 3640, a C2 clutch 3650, and a one-way clutch F3660.

The first set 3300 is a single-pinion type planetary gear mechanism. The first set 3300 includes a sun gear S (UD) 3310, a pinion 3320, a ring gear R (UD) 3330, and a carrier C (UD) 3340.

The sun gear S (UD) 3310 is connected to the output shaft 3210 of the torque converter 3200. The pinion 3320 is rotatably supported by the carrier C (UD) 3340. The pinion 3320 is engaged with the sun gear S (UD) 3310 and the ring gear R (UD) 3330.

The ring gear R (UD) 3330 is fixed to the gear case 3600 by the B3 brake 3630. The carrier C (UD) 3340 is fixed to the gear case 3600 by the B1 brake 3610.

The second set 3400 is a Ravigneaux type planetary gear mechanism. The second set 3400 includes a sun gear S (D) 3410, a short pinion 3420, a carrier C (1) 3422, a long pinion (3430), a carrier C (2) 3432, a sun gear S (S) 3440, and a ring gear R (1) (R (2)) 3450.

The sun gear S (D) 3410 is connected to the carrier C (UD) 3340. The short pinion 3420 is rotably supported by the carrier C (1) 3422. The short pinion 3420 is engaged with the sun gear S (D) 3410 and the long pinion 3430. The carrier C (1) 3422 is connected to the output gear 3500.

The long pinion 3430 is rotatably supported by the carrier C (2) 3432. The long pinion 3430 is engaged with the short pinion 3420, the sun gear S (S) 3440, and the ring gear R (1) (R (2)) 3450. The carrier C (2) 3432 is connected to the output gear 3500.

The sun gear S (S) 3440 is connected to the output shaft 3210 of the torque converter 3200 by the C1 clutch 3640. The ring gear R (1) (R (2)) 3450 is fixed to the gear case 3600 by the B2 brake 3620, and is connected to the output shaft 3210 of the torque converter 3200 by the C2 clutch 3650. The ring gear R (1) (R (2)) 3450 is connected to the one-way clutch F3660. When the first gear ratio is selected, the ring gear R (1) (R (2)) 3450 is not rotatable.

The one-way clutch F3660 is provided in parallel with the B2 brake 3620. That is, the outer race of the one-way clutch F3660 is fixed to the gear case 3600. The inner race of the one-way clutch F3660 is connected to the ring gear R (1) (R(2)) 3450 via the rotational shaft.

Figure 3:
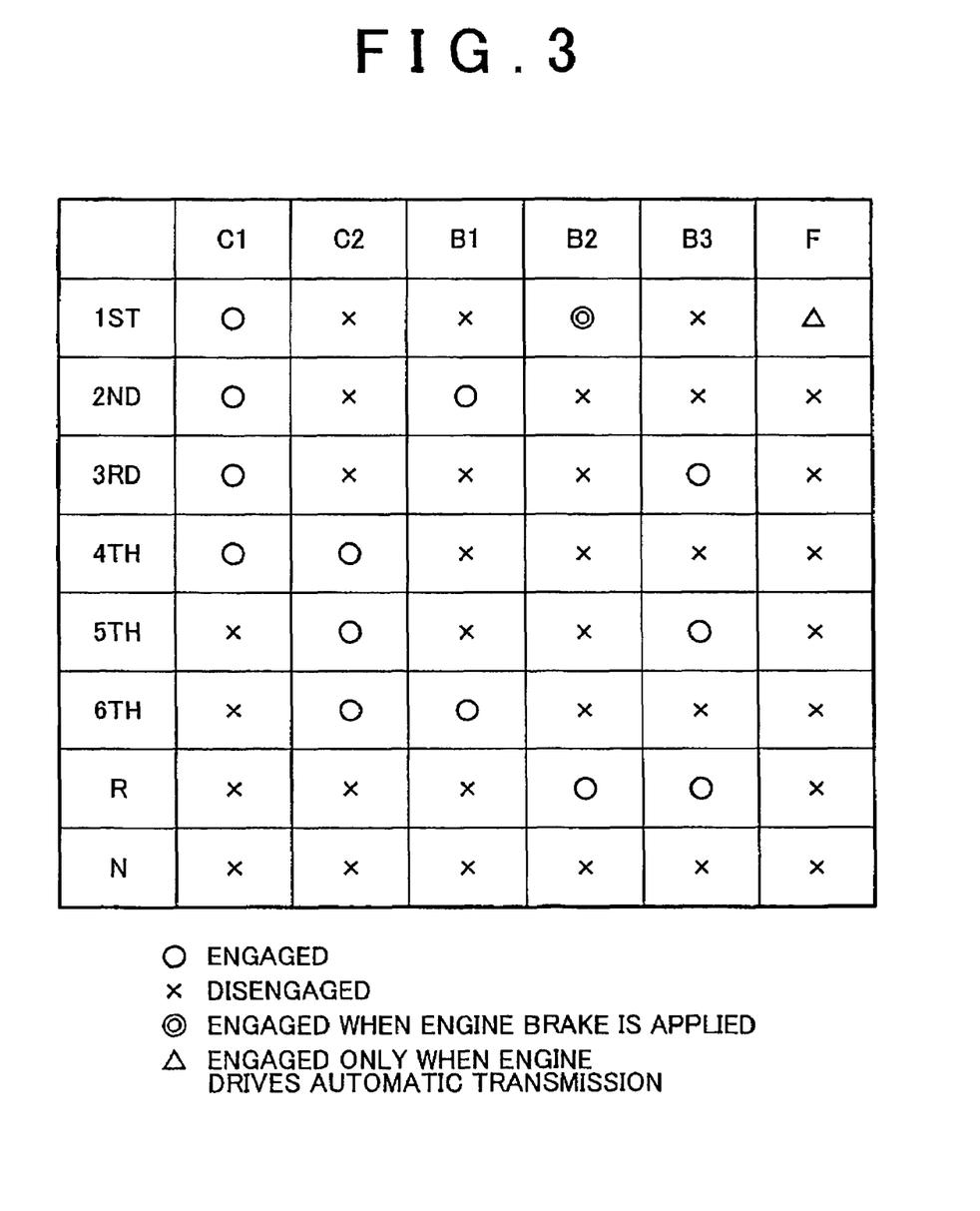
FIG. 3 is a diagram showing an operation table of the automatic transmission.

FIG. 3 is an operation table that indicates the relation between the gear ratios and the operating states of the clutches and brakes. By operating the brakes and clutches according to the combinations shown in the operation table, any one of the forward first to sixth gear ratios and a reverse gear ratio is selected.

Figure 4:
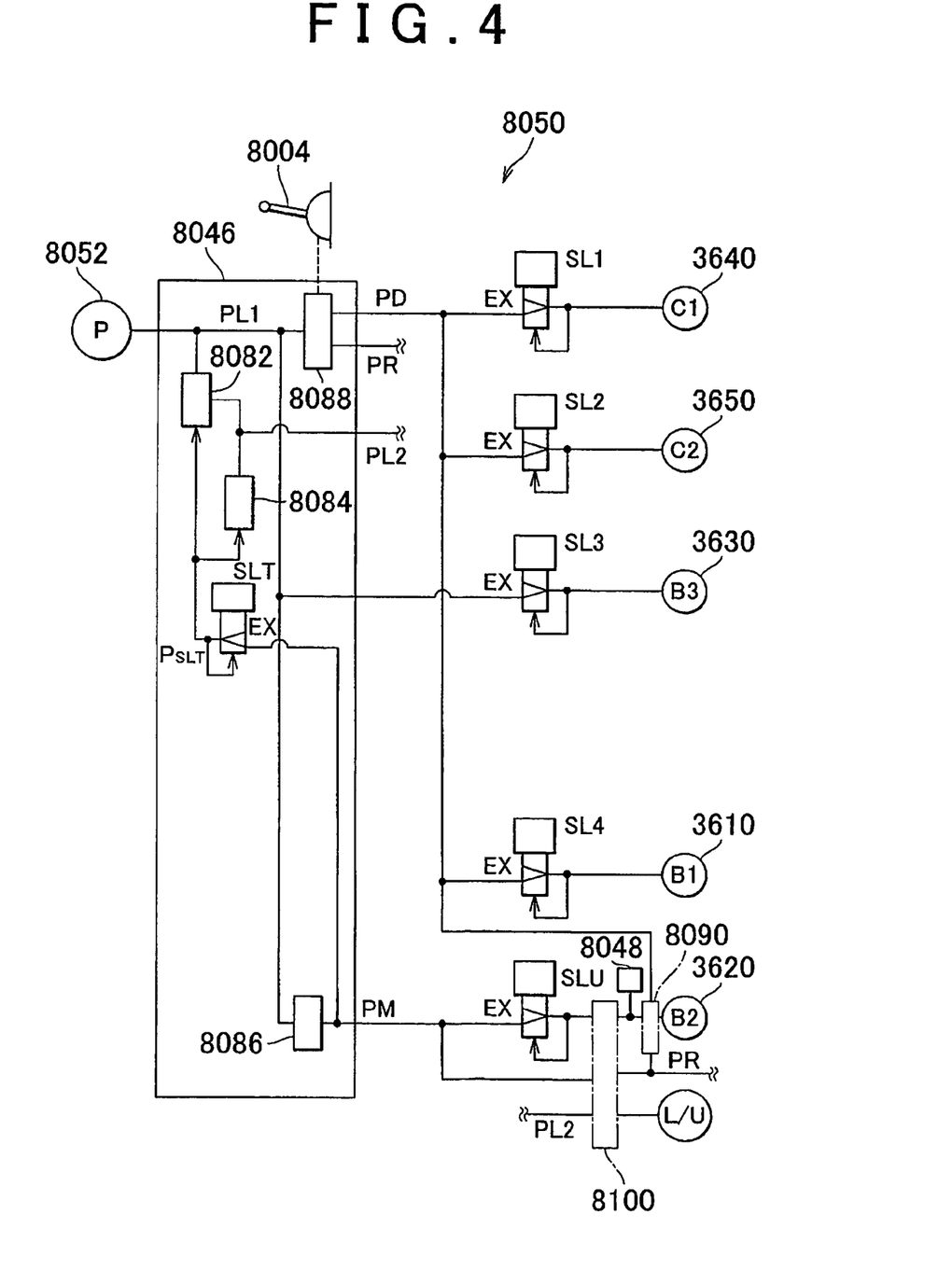
FIG. 4 is a diagram showing a hydraulic control circuit in the automatic transmission.

FIG. 4 shows a hydraulic control circuit 8050 that constitutes a part of the hydraulic control device 4000. The hydraulic control circuit 8050 relates to solenoid valves SL1 to SL4, and SLU that control the operation of actuators for the clutches and brakes, and the lock-up clutch 9038.

In FIG. 4, the solenoid valves SL1, SL2, and SL4 generate hydraulic pressures by regulating a D-range pressure (i.e., a forward-range pressure, or a forward hydraulic pressure) PD output from a hydraulic-pressure supply device 8046, and supply the hydraulic pressures to the hydraulic actuators (hydraulic cylinders) for the C1 clutch 3640, the C2 clutch 3650, and the B1 brake 3610, respectively. The solenoid valve SL3 generates a hydraulic pressure by regulating a line pressure PL1 (will be sometimes referred to as "primary line pressure PL1") output from the hydraulic-pressure supply device 8046, and supplies the hydraulic pressure to the hydraulic actuator for the B3 brake 3630.

The D-range pressure PD or a reverse pressure PR output from the hydraulic-pressure supply device 8046 is supplied to the B2 brake 3620 via a B2 brake control circuit 8090. The linear solenoid valve SLU outputs a control pressure $P_{SLU}$ using a modulator pressure PM output from the hydraulic-pressure supply device 8046 as the original pressure. The control pressure $P_{SLU}$ is supplied to the B2 brake control circuit 8090 via a switching circuit 8100. A hydraulic-pressure switch 8048 is provided on the input-side of the B2 brake control circuit 8090. The hydraulic-pressure switch 8048 outputs a predetermined signal, for example, an ON signal $SW_{ON}$ to the ECU 8000 when the control pressure $P_{SLU}$, which is supplied to the B2 brake control circuit 8090 via the switching circuit 8100, is equal to or higher than a predetermined pressure at which engagement torque for the B2 brake 3620 is generated.

The hydraulic-pressure supply device 8046 includes a primary regulator valve 8082, a secondary regulator valve 8084, a linear solenoid valve SLT, a modulator valve 8086, and a manual valve 8088. The primary regulator valve 8082 regulates the line pressure PL1 using the hydraulic pressure generated by an oil pump 8052 as the original pressure. The oil pump 8052 is a mechanical pump rotated by the engine 1000.

The secondary regulator valve 8084 regulates a line pressure PL2 (will be sometimes referred to as "secondary line pressure PL2", or "secondary pressure PL2") using the hydraulic pressure discharged from the primary regulator valve 8082 as the original pressure. The linear solenoid valve SLT supplies a signal pressure $P_{SLT}$ to the primary regulator valve 8082 and the secondary regulator valve 8084 to regulate the line pressures PL1 and PL2 according to the load on the engine 1000 and the like. The modulator valve 8086 regulates the modulator pressure PM using the line pressure PL1 as the original pressure. The manual valve 8088 is mechanically operated, and an oil passage is switched according to the operation of the shift lever 8004 that is mechanically connected to the manual valve 8088 via a cable or a link. Thus, when the shift lever 8004 is at the position D, the manual valve 8088 outputs the D-range pressure PD using the line pressure PL1 input to the manual valve 8088 as the original pressure. When the shift lever 8004 is at the position R, the manual valve 8088 outputs the reverse pressure PR using the line pressure PL1 as the original pressure. Thus, the hydraulic-pressure supply device 8046 supplies the line pressure PL1, the line pressure PL2, the D-range pressure PD, and the reverse pressure PR.

The solenoid valves SL1 to SL4, and the linear solenoid valve SLU basically have the same configuration. Each of the solenoid valves SL1 to SL4, and the linear solenoid valve SLU is energized, and de-energized independently. Thus, the hydraulic pressure for each hydraulic actuator is regulated independently. As a result, the engagement pressure for each of the C1 clutch 3640, the C2 clutch 3650, the B1 brake 3610, the B2 brake 3620, and the B3 brake 3630 is controlled.

The linear solenoid valve SLU is one valve that selectively controls the engagement pressure for the B2 brake 3620, and the torque capacity of the lock-up clutch 9038, via a switching circuit 8100 that switches an oil passage. When engine brake is applied (particularly when engine brake is applied while the vehicle is moving at low speed), the lock-up clutch 9038 is disengaged to prevent an engine stall. Therefore, the engagement pressure for the B2 brake 3620 and the torque capacity of the lock-up clutch 9038 do not need to be controlled simultaneously. Thus, one solenoid valve is used to control the engagement pressure for the B2 brake 3620, and the torque capacity of the lock-up clutch 9038. The B2 brake 3620 is a hydraulic frictional engagement element that is engaged only when the engine brake is applied, as shown in FIG. 3.

Figure 5:
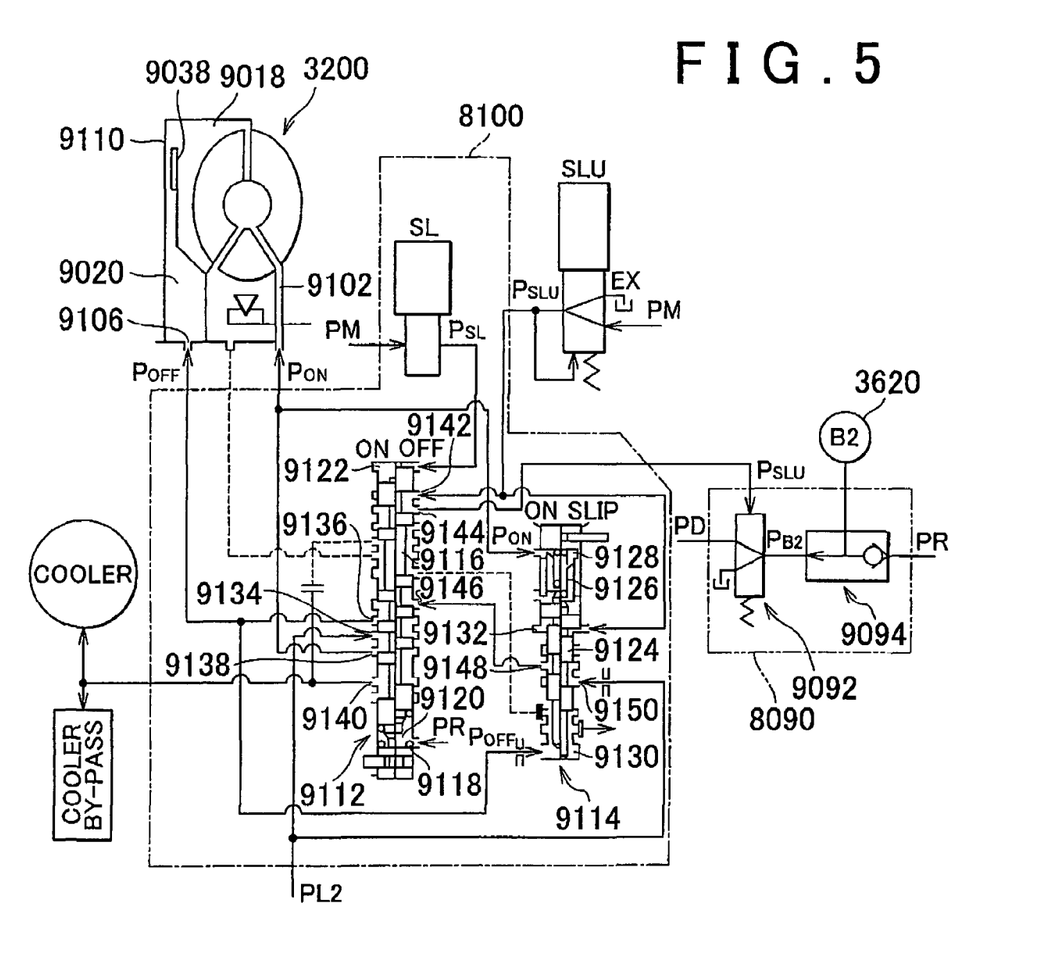
FIG. 5 is a diagram showing a part of the hydraulic control circuit in the automatic transmission.

FIG. 5 is a schematic diagram showing the B2 brake control circuit 8090 and the switching circuit 8100, and explaining the control of the engagement pressure for the B2 brake 3620, and the control of the torque capacity of the lock-up clutch 9038. The linear solenoid valve SLU selectively controls the engagement pressure for the B2 brake 3620 and the torque capacity of the lock-up clutch 9038, via the switching circuit 8100.

In FIG. 5, the B2 brake control circuit 8090 includes a secondary brake control valve 9092, and a shuttle valve 9094. The secondary brake control valve 9092 outputs an engagement pressure $P_{B2}$ for the B2 brake 3620 using the D-range pressure PD as the original pressure, according to the control pressure $P_{SLU}$. When the engagement pressure $P_{B2}$ from the secondary brake control valve 9092, or the reverse pressure PR is supplied to the shuttle valve 9094, the shuttle valve 9094 outputs the supplied pressure. When the control pressure $P_{SLU}$ is supplied to the B2 brake control circuit 8090, the B2 brake control circuit 8090 outputs the engagement pressure $P_{B2}$ to the B2 brake 3620. When the reverse pressure PR is supplied to the B2 brake control circuit 8090, the B2 brake control circuit 8090 outputs the reverse pressure PR to the B2 brake 3620.

As known in public, the lock-up clutch 9038 is a hydraulic frictional clutch that is frictionally engaged with a front cover 9110 according to a pressure difference $\Delta P\ (=P_{ON}-P_{OFF})$ that is the difference between a hydraulic pressure $P_{ON}$ in an engagement-side oil chamber 9018 supplied via an engagement oil passage 9102, and a hydraulic pressure $P_{OFF}$ in a disengagement-side oil chamber 9020 supplied via a disengagement oil passage 9106. The torque converter 3200 may operate under one of three operating conditions, a so-called lock-up off condition, a slip condition, and a lock-up on condition. When the torque converter 3200 operates under the lock-up off condition, the pressure difference $\Delta P$ is a negative value, and the lock-up clutch 9038 is disengaged. When the torque converter 3200 operates under the slip condition, the pressure difference $\Delta P$ is zero or more, and the lock-up clutch 9038 is semi-engaged. When the torque converter 3200 operates under the lock-up on condition, the pressure difference $\Delta P$ is greatest, and the lock-up clutch 9038 is completely engaged. If the pressure difference $\Delta P$ is zero when the lock-up clutch 9038 is in the slip state, the torque share of the lock-up clutch 9038 is zero. In this case, the torque converter 3200 operates under the operating condition that is equivalent to the lock-up off condition.

The switching circuit 8100 includes a lock-up relay valve 9112, and a lock-up control valve 9114. The lock-up relay valve 9112 switches the state of the lock-up clutch 9038 between a disengaged state, and an engaged state (i.e., a slip state including a partly disengaged state, or a completely engaged state). When the lock-up relay valve 9112 places the lock-up clutch 9038 in the engaged state, the lock-up control valve 9114 changes the state of the lock-up clutch 9038 in the range from the slip state including the partly disengaged state to the completely engaged state, by adjusting the pressure difference $\Delta P$.

The lock-up relay valve 9112 includes a spool valve element 9116, a spring 9118, an oil chamber 9120, and an oil chamber 9122. The spring 9118 is provided on one shaft end-side of the spool valve element 9116. The spring 9118 applies thrust force, which is directed toward a disengagement (OFF)-side position, to the spool valve element 9116. The oil chamber 9120 receives the reverse pressure PR to urge the spool valve element 9116 toward the OFF-side position. The oil chamber 9122 is provided on the other shaft end-side of the spool valve element 9116. The oil chamber 9122 receives a control pressure $P_{SL}$ to urge the spool valve element 9116 toward an engagement (ON)-side position. An ON-OFF solenoid valve SL outputs the control pressure $P_{SL}$ using the modulator pressure PM as the original pressure. The ON-OFF solenoid valve SL is energized or de-energized by the ECU 8000. The ON-OFF solenoid valve SL functions as a control-pressure generation valve that generates the control pressure to switch the state of the lock-up clutch 9038 between the engaged state and the disengaged state.

The lock-up control valve 9114 includes a spool valve element 9124, a spring 9126, an oil chamber 9128, and an oil chamber 9130. The spring 9126 applies thrust force $F_{9126}$, which is directed toward a SLIP-side position, to the spool valve element 9124. The oil chamber 9128 receives the hydraulic pressure $P_{ON}$ in the engagement-side oil chamber 9018 of the torque converter 3200 to urge the spool valve 9124 toward the SLIP-side position. The oil chamber 9130 receives the hydraulic pressure $P_{OFF}$ in the disengagement-side oil chamber 9020 of the torque converter 3200 to urge the spool valve element 9124 to a complete engagement (ON)-side position. Hereinafter, the control pressure $P_{SLU}$ for the slip control that is supplied to the lock-up control valve 9114 may be sometimes referred to as "slip control signal pressure $P_{lin}$".

The switching circuit 8100 thus configured allows/interrupts the supply of the pressure of hydraulic oil to the engagement-side oil chamber 9018 and the disengagement-side oil chamber 9020, thereby changing the operating state of the lock-up clutch 9038. Alternatively, the switching circuit 8100 supplies the pressure of hydraulic oil to the B2 brake 3620, thereby controlling the engagement pressure for the B2 brake 3620.

First, the case where the lock-up clutch 9038 is disengaged, and the control pressure $P_{SLU}$ can be supplied to the B2 brake 3620 will be described. When the control pressure $P_{SL}$ is not supplied to the oil chamber 9122, and the thrust force of the spring 9118 urges the spool valve element 9116 to the disengagement (OFF)-side position in the lock-up relay valve 9112, the line pressure PL2 supplied to an input port 9134 is supplied from a disengagement-side port 9136 to the disengagement-side oil chamber 9020 via the disengagement oil passage 9106. The hydraulic oil is discharged from the engagement-side oil chamber 9018 to an engagement-side port 9138 via the engagement oil passage 9102, and the hydraulic oil is discharged from a discharge port 9140 to an oil cooler and a cooler by-pass. Thus, the lock-up clutch 9038 is disengaged.

When the spool valve element 9116 is moved to the disengagement-side position in the lock-up relay valve 9112, the control pressure $P_{SLU}$ supplied to the input port 9142 can be supplied from a brake-side port 9144 to the B2 brake control circuit 8090. At this time, the linear solenoid valve SLU outputs the engagement pressure for the B2 brake 3620 via the B2 brake control circuit 8090. Also, the hydraulic-pressure switch 8048 outputs the ON signal $SW_{ON}$ to the ECU 8000.

Next, the case where the lock-up clutch 9038 is placed in the slip state including the partly disengaged state, or is completely engaged, and the control pressure $P_{SLU}$ cannot be supplied to the B2 brake 3620 will be described. When the control pressure $P_{SL}$ is supplied to the oil chamber 9122, and the spool valve element 9116 is urged to the engagement (ON)-side position in the lock-up relay valve 9112, the line pressure PL2 supplied to the input port 9134 is supplied from the engagement-side port 9138 to the engagement-side oil chamber 9018 via the engagement passage 9102. The line pressure PL2 supplied to the engagement-side oil chamber 9018 becomes the hydraulic pressure $P_{ON}$. At the same time, communication is provided between the disengagement-side oil chamber 9020 and the control port 9148 of the lock-up control valve 9114 via the disengagement oil passage 9106, the disengagement-side port 9136, and a by-pass port 9146. Then, the lock-up control valve 9114 adjusts the hydraulic pressure $P_{OFF}$ in the disengagement-side oil chamber 9020, that is, the pressure difference ΔP, thereby changing the operating state of the lock-up clutch 9038 in the range from the slip state including the partly disengaged state to the completely engaged state.

More specifically, when the spool valve element 9116 is urged to the engagement-side position in the lock-up relay valve 9112, that is, when the state of the lock-up clutch 9038 is switched to the engaged state, the control pressure $P_{SLU}$ that urges the spool valve element 9124 toward the complete engagement (ON)-side position may not be supplied to an oil chamber 9132, and the thrust force $F_{9126}$ of the spring 9126 may move the spool valve element 9124 to the SLIP-side position in the lock-up control valve 9114. In this case, the line pressure PL2 supplied to the input port 9150 is supplied from the control port 9148 to the disengagement-side oil chamber 9020 via the by-pass port 9146, the disengagement-side port 9136, and the disengagement oil passage 9106. In this situation, the control pressure $P_{SLU}$ controls the pressure difference ΔP, thereby controlling the slip state (including the partly disengaged state) of the lock-up clutch 9038.

When the spool valve element 9116 is urged to the engagement position in the lock-up relay valve 9112, the control pressure $P_{SLU}$ that urges the spool valve element 9124 to the complete engagement (ON)-side position may be supplied to the oil chamber 9132 in the lock-up control valve 9114. In this case, the line pressure PL2 is not supplied from the input port 9150 to the disengagement-side oil chamber 9020, and the hydraulic oil is discharged from the disengagement-side oil chamber 9020. Thus, the pressure difference ΔP becomes the maximum value, and the lock-up clutch 9038 is completely engaged.

In this embodiment, when the shift is being performed while the accelerator pedal is released, the primary line pressure PL1 is set to a high pressure. The primary line pressure PL1 is set to a low pressure to improve fuel efficiency when the shift is not being performed. If a predetermined condition is satisfied while the vehicle is decelerated by releasing the accelerator pedal, a slip control is executed to place the lock-up clutch 9038 in the slip state.

When the slip control is executed, the ON-OFF solenoid valve SL moves the spool valve element 9116 to the engagement-side position in the lock-up relay valve 9112, and the linear solenoid valve SLU outputs the slip control signal $P_{lin}$ to place the lock-up clutch 9038 in a predetermined slip state.

When the primary line pressure PL1 is sharply increased while the slip control is being executed, the lock-up clutch 9038 may be engaged. That is, when the signal pressure $P_{SLT}$ from the linear solenoid valve SLT is changed to increase the primary line pressure PL1, the secondary line pressure PL2 is also increased, and the hydraulic pressure $P_{ON}$ in the engagement-side oil chamber 9018 is increased. The linear solenoid valve SLU uses the modulator pressure PM as the original pressure. The modulator pressure PM is regulated using the primary line pressure PL1 as the original pressure. Therefore, when the primary line pressure PL1 is increased, the modulator pressure PM is increased, and the slip control signal $P_{lin}$ is also increased.

Figure 6:
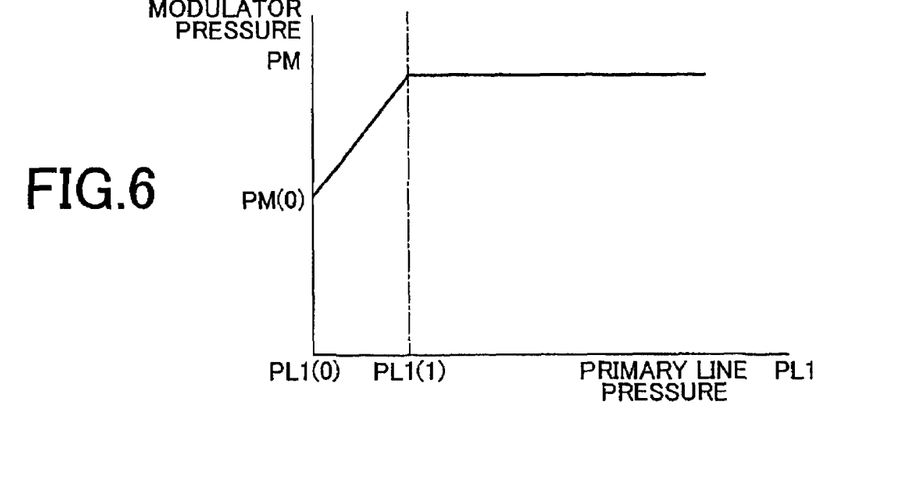
FIG. 6 is a diagram showing the relation between a primary line pressure and a modulator pressure.

FIG. 6 shows the relation between the primary line pressure PL1 and the modulator pressure PM regulated by the modulator valve 8086. The modulator valve 8086 regulates the modulator pressure PM to a constant pressure (set pressure), using the primary line pressure PL1 as the original pressure. However, when the primary line pressure PL1 is lower than the set pressure, the modulator valve 8086 cannot regulate the modulator pressure PM to the constant pressure. That is, when the primary line pressure PL1 is lower than the set pressure (i.e., when the primary line pressure PL1 is lower than a pressure PL1 (1)), the modulator pressure PM increases as the primary line pressure PL1 increases. Therefore, if the primary line pressure PL1 is set to a low pressure PL1 (0) when the shift is not being performed, and the primary line pressure PL1 is set to a high pressure that is equal to or higher than the pressure PL1 (1) when the shift is being performed, the modulator pressure PM is increased from a pressure PM (0) toward the set pressure when the shift starts.

Figure 7A:
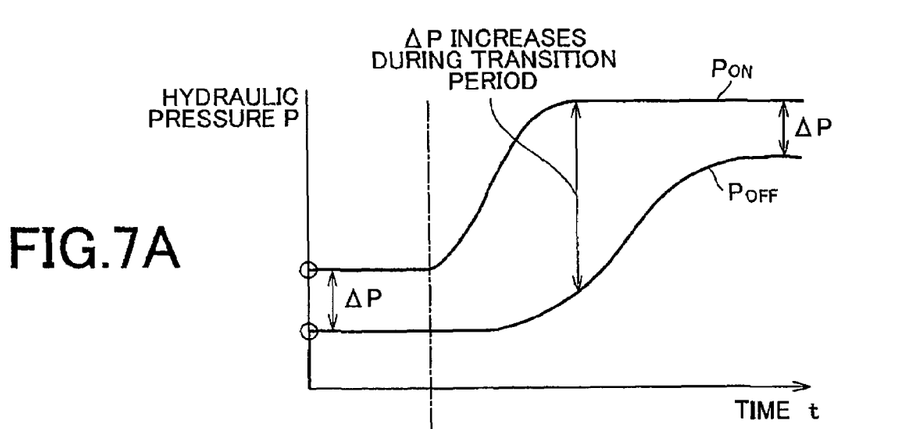
FIG. 7A is a diagram showing time-dependent changes in a difference between a hydraulic pressure in an engagement-side oil chamber and a hydraulic pressure in a disengagement-side oil chamber when the primary line pressure is changed.

FIG. 7A shows time-dependent changes in the pressure difference ΔP that is the difference between the hydraulic pressure $P_{ON}$ in the engagement-side oil chamber 9018 and the hydraulic pressure $P_{OFF}$ in the disengagement-side oil chamber 9020 when the primary line pressure PL1 is changed from the pressure PL1 (0). Before time point t (0), the shift is not being performed, and the slip control is executed while the primary line pressure PL1 is set to the pressure PL1 (0). The shift starts at time point t (0). After time point t (0), the slip control continues to be executed.

Figure 7B:
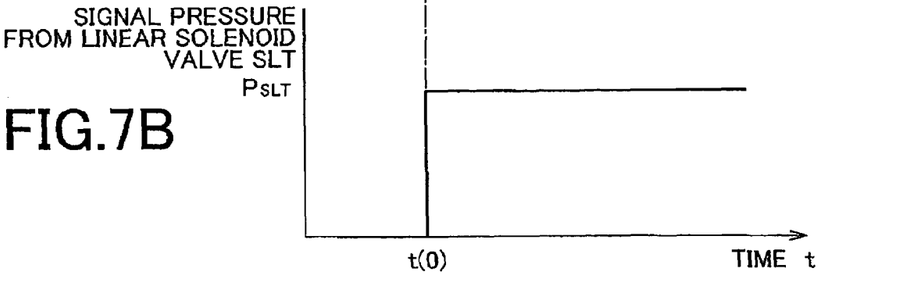
FIG. 7B is a diagram showing time-dependent changes in a signal pressure from a linear solenoid valve.

When the shift starts, and the signal pressure $P_{SLT}$ from the linear solenoid valve SLT is changed to increase the primary line pressure PL1 at time point t (0) as shown in FIG. 7B, the secondary line pressure PL2 is also increased, and the hydraulic pressure $P_{ON}$ in the engagement-side oil chamber 9018 is increased. As the hydraulic pressure $P_{ON}$ in the engagement-side oil chamber 9018 is increased, the hydraulic pressure $P_{OFF}$ in the disengagement-side oil chamber 9020 is also increased. However, the hydraulic pressure $P_{ON}$ reaches a target value earlier than the hydraulic pressure $P_{OFF}$. Therefore, the pressure difference ΔP grows due to difference of rate of oil pressure rise.

Also, as the modulator pressure PM is increased from the pressure PM (0) toward the set pressure, the slip control signal pressure $P_{lin}$ is also increased. Thus, when the slip control signal pressure $P_{lin}$ is increased, the lock-up control valve 9114 executes a control to increase the pressure difference ΔP that is the difference between the hydraulic pressure $P_{ON}$ in the engagement-side oil chamber 9018 and the hydraulic pressure $P_{OFF}$ in the disengagement-side oil chamber 9020. As a result, the pressure difference ΔP is further increased. The slip control signal pressure $P_{lin}$ is changed by a feedback control so that the lock-up clutch 9038 is actually placed in the predetermined slip state. However, there is a time lag between when the feedback control is executed and when the slip control signal pressure $P_{lin}$ is changed. Therefore, the pressure difference ΔP that is the difference between the hydraulic pressure $P_{ON}$ in the engagement-side oil chamber 9018 and the hydraulic pressure $P_{OFF}$ in the disengagement-side oil chamber 9020 is decreased after the time lag.

Thus, during the transitional period before each hydraulic pressure is maintained at a certain value, the pressure difference ΔP that is the difference between the hydraulic pressure $P_{ON}$ in the engagement-side oil chamber 9018 and the hydraulic pressure $P_{OFF}$ in the disengagement-side oil chamber 9020 is increased. Therefore, in this case, while the slip control for the lock-up clutch 9038 is being executed, the lock-up clutch 9038 is engaged. Accordingly, the ECU 8000, which is the control apparatus according to the embodiment, sets the line pressure PL1 to the low pressure to improve fuel efficiency, when the shift is not being performed while the accelerator pedal is released. Also, the ECU 8000 avoids the engagement of the lock-up clutch 9038 when the line pressure PL1 is increased while the slip control for the lock-up clutch 9038 is being executed.

Figure 8:
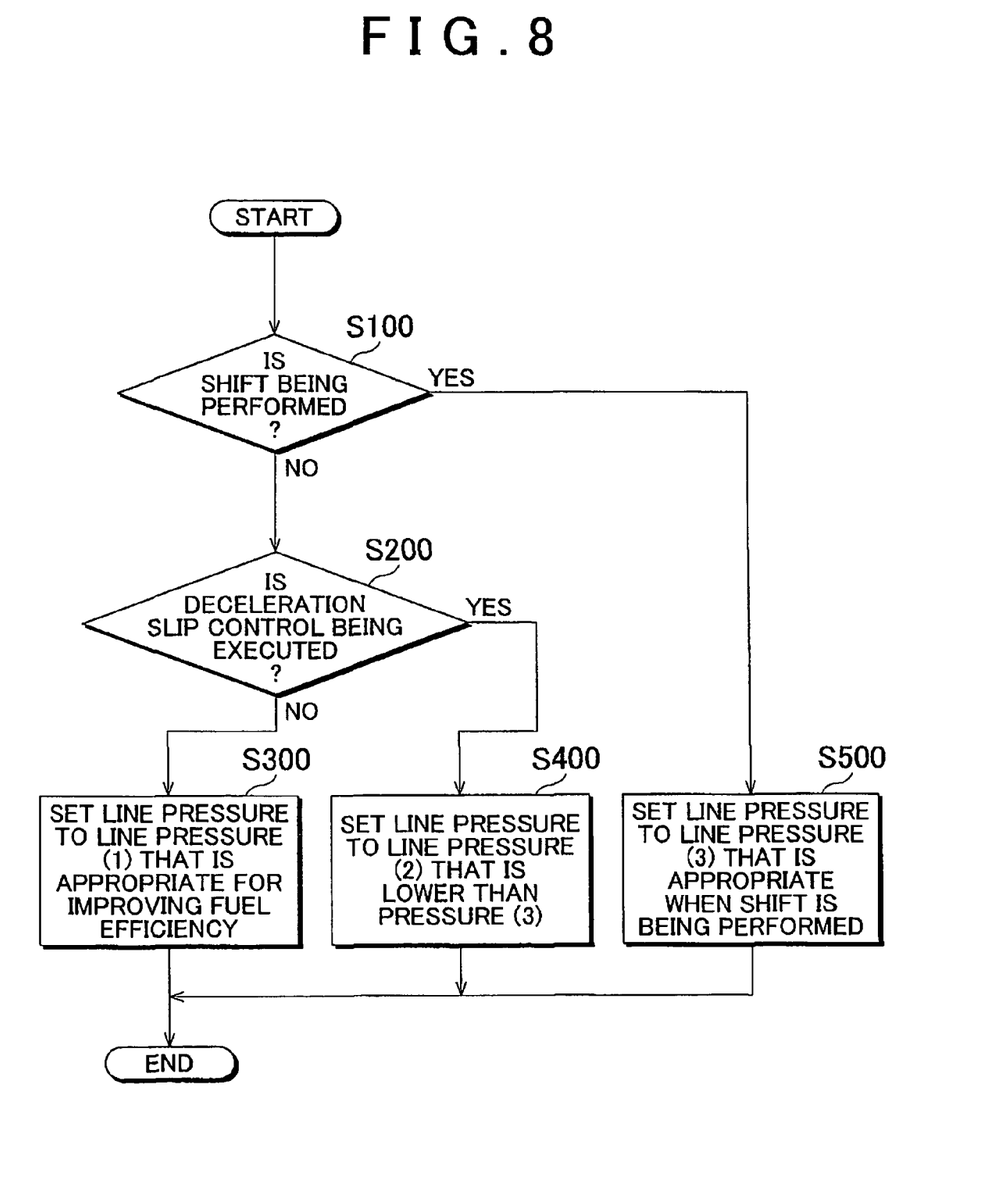
FIG. 8 is a flowchart showing the control structure of a program executed by the ECU that is the control apparatus according to the embodiment of the invention.

The control structure of a program executed by the ECU 8000 that is the control apparatus according to the embodiment will be described with reference to FIG. 8. The routine described below is executed when the accelerator pedal is released.

In step S100, the ECU 8000 determines whether the shift is being performed, based on whether the ECU 8000 outputs an instruction signal to a shift solenoid valve. If the shift is being performed (YES in step S100), the routine proceeds to step S500. If the shift is not being performed (NO in step S100), the routine proceeds to step S200.

In step S200, the ECU 8000 determines whether a deceleration slip control is being executed to place the lock-up clutch 9038 in the slip state while the vehicle is decelerated (i.e., the accelerator pedal is released). If it is determined that the deceleration slip control is being executed (YES in step S200), the routine proceeds to step S400. If it is determined that the deceleration slip control is not being executed (NO in step S200), the routine proceeds to step S300.

In step S300, the ECU 8000 outputs an instruction signal to the linear solenoid valve SLT (more specifically, an electric drive circuit for the linear solenoid valve SLT) so that the line pressure is equal to a line pressure (1) that is appropriate for improving fuel efficiency (that is the pressure PL1 (0) in FIG. 6).

In step S400, the ECU 8000 outputs an instruction signal to the linear solenoid valve SLT (more specifically, the electric drive circuit for the linear solenoid valve SLT) so that the line pressure is equal to a line pressure (2) that is lower than a line pressure (3) that is appropriate when the shift is being performed.

In step S500, the ECU 8000 outputs an instruction signal to the linear solenoid valve SLT (more specifically, the electric drive circuit for the linear solenoid valve SLT) so that the line pressure is equal to the line pressure (3) that is appropriate when the shift is being performed.

The line pressure (1) in step S300 is lowest. The line pressure (2) in step S400 is lower than the line pressure (3) in step S500.

The ECU 8000, which is the control apparatus according to the embodiment, avoids the engagement of the lock-up clutch based on the above-described structure and flowchart, while the deceleration slip control is being executed. The operation of the ECU 8000 for avoiding the engagement of the lock-up clutch will be described with reference to FIG. 9.

Figure 9:
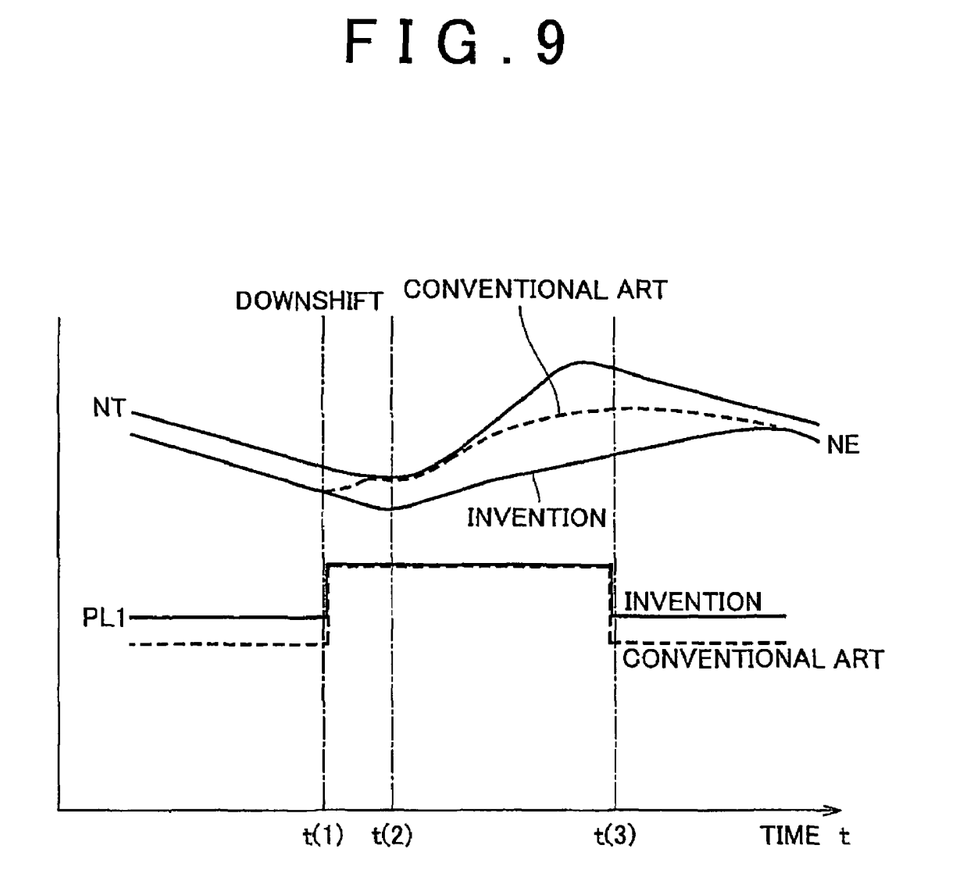
FIG. 9 is a timing chart when an instruction is output to perform downshift.

For example, when the driver does not depress the accelerator pedal, and the vehicle is coasting, the slip control for the lock-up clutch 9038 of the torque converter 3200 is executed. When the vehicle speed decreases due to running resistance or the like, downshift is performed to increase the engine speed and to increase a period in which fuel supply is cut off. In FIG. 9, the downshift starts at time point t (1), and the downshift ends at time point t (3).

In conventional art, when the shift starts at time point t (1), the line pressure is increased from the line pressure (1) that is appropriate for improving fuel efficiency to the line pressure (3) that is appropriate when the shift is being performed. When the shift ends at time point t (3), the line pressure is returned to the low line pressure (1) as shown by a dotted line in FIG. 9. Therefore, the lock-up clutch 9038 is engaged and a great shift-shock occurs at time point t (2).

According to the invention, even when the shift is not being performed (NO in step S100), if the deceleration slip control is being executed (YES in step S200), the line pressure is increased to the line pressure (2) that is lower than the line pressure (3) that is appropriate when the shift is being performed (S400). Therefore, while the slip control for the lock-up clutch 9038 is being executed, the line pressure has already been increased to the line pressure (2) at time point t (1) at which the shift starts. Therefore, the line pressure is not greatly changed at time point t (1). Thus, the lock-up clutch 9038 is not engaged. As a result, a great shift-shock does not occur.

It is preferable to set the line pressure (2) to the lowest possible value to improve fuel efficiency, as long as the lock-up clutch 9038 is not engaged when the shift starts while the slip control is being executed. However, the line pressure (2) may be equal to the line pressure (3). In this case, when the shift starts, the line pressure does not change. This reliably avoids the engagement of the lock-up clutch 9038. The lock-up clutch 9038 may be engaged due to the increase in the modulator pressure PM as shown in FIG. 6. However, if the line pressure (2) is equal to or higher than the pressure PL1 (1)

in FIG. 6, the modulator PM is not increased. This avoids the engagement of the lock-up clutch 9038.

As described above, when the shift is performed while the slip control for the lock-up clutch is being executed, a change in the line pressure is suppressed. This avoids the engagement of the lock-up clutch due to a sudden change in the line pressure. As a result, it is possible to reduce the possibility that a shift-shock occurs due to the engagement of the lock-up clutch while the slip control is being executed.

Thus, the embodiment of the invention that has been disclosed in the specification is to be considered in all respects as illustrative and not restrictive. The technical scope of the invention is defined by claims, and all changes which come within the meaning and range of equivalency of the claims are therefore intended to be embraced therein.

What is claimed is:

1. A line pressure control apparatus for an automatic transmission that includes a lock-up clutch, comprising:
   a first determination device that determines whether the automatic transmission is shifting;
   a second determination device that determines whether a slip control for the lock-up clutch is being executed while a vehicle is decelerated by releasing an accelerator pedal; and
   a setting device that sets a line pressure to a first value that is higher than a second value if the first determination device determines that the automatic transmission is shifting, wherein the setting device sets the line pressure to the second value if the first determination device determines that the automatic transmission is not shifting, and the second determination device determines that the slip control is not being executed while the vehicle is decelerated by releasing the accelerator pedal, and the setting device sets the line pressure to a value higher than the second value if the first determination device determines that the automatic transmission is not shifting, and the second determination device determines that the slip control is being executed while the vehicle is decelerated by releasing the accelerator pedal.

2. The line pressure control apparatus for the automatic transmission according to claim 1, wherein the setting device includes a device that sets the line pressure to a value that is higher than the second value and is lower than the first value if the first determination device determines that the automatic transmission is not shifting, and the second determination device determines that the slip control is being executed while the vehicle is decelerated by releasing the accelerator pedal.

3. The line pressure control apparatus for the automatic transmission according to claim 1, wherein the setting device sets the first value to a value that is appropriate when the automatic transmission is shifting, and the setting device sets the second value to a value that is appropriate for improving fuel efficiency.

4. The line pressure control apparatus for the automatic transmission according to claim 3, wherein if the first determination device determines that the automatic transmission is not shifting, and the second determination device determines that the slip control is being executed while the vehicle is decelerated by releasing the accelerator pedal, the setting device sets the line pressure to a value that is equal to or lower than the value that is appropriate when the automatic transmission is shifting.

5. The line pressure control apparatus for the automatic transmission according to claim 3, wherein if the first determination device determines that the automatic transmission is not shifting, and the second determination device determines that the slip control is being executed while the vehicle is decelerated by releasing the accelerator pedal, the setting device sets the line pressure to the first value.

6. The line pressure control apparatus for the automatic transmission according to claim 3, wherein if the first determination device determines that the automatic transmission is not shifting, and the second determination device determines that the slip control is being executed while the vehicle is decelerated by releasing the accelerator pedal, the setting device sets the line pressure to a value at which the lock-up clutch is not engaged when the automatic transmission starts to shift while the slip control is being executed.

7. A line pressure control method for an automatic transmission that includes a lock-up clutch, comprising the steps of:
   determining whether the automatic transmission is shifting;
   determining whether a slip control for the lock-up clutch is being executed while a vehicle is decelerated by releasing an accelerator pedal;
   setting a line pressure to a first value that is higher than a second value if it is determined that the automatic transmission is shifting;
   setting the line pressure to the second value if it is determined that the automatic transmission is not shifting, and it is determined that the slip control is not being executed while the vehicle is decelerated by releasing the accelerator pedal; and
   setting the line pressure to a value that is higher than the second value if it is determined that the automatic transmission is not shifting, and it is determined that the slip control is being executed while the vehicle is decelerated by releasing the accelerator pedal.

8. The line pressure control method for the automatic transmission according to claim 7, wherein the line pressure is set to a value that is higher than the second value and is lower than the first value if it is determined that the automatic transmission is not shifting, and it is determined that the slip control is being executed while the vehicle is decelerated by releasing the accelerator pedal.

9. The line pressure control method for the automatic transmission according to claim 7, wherein the first value is set to a value that is appropriate when the automatic transmission is shifting, and the second value is set to a value that is appropriate for improving fuel efficiency.

10. The line pressure control method for the automatic transmission according to claim 9, wherein if it is determined that the automatic transmission is not shifting, and it is determined that the slip control is being executed while the vehicle is decelerated by releasing the accelerator pedal, the line pressure is set to a value that equal to or lower than the value that is appropriate when the automatic transmission is shifting.

11. The line pressure control method for the automatic transmission according to claim 9, wherein if it is determined that the automatic transmission is not shifting, and it is determined that the slip control is being executed while the vehicle is decelerated by releasing the accelerator pedal, the line pressure is set to the first value.

12. The line pressure control method for the automatic transmission according to claim 9, wherein if it is determined that the automatic transmission is not shifting, and it is determined that the slip control is being executed while the vehicle is decelerated by releasing the accelerator pedal, the line pressure is set to a value at which the lock-up clutch is not engaged when the automatic transmission starts to shift while the slip control is being executed.

13. A line pressure control apparatus for an automatic transmission that includes a lock-up clutch, comprising:

first determination means for determining whether the automatic transmission is shifting;

second determination means for determining whether a slip control for the lock-up clutch is being executed while a vehicle is decelerated by releasing an accelerator pedal; and setting means for setting a line pressure to a first value that is higher than a second value if the first determination means determines that the automatic transmission is shifting, wherein the setting means sets the line pressure to the second value if the first determination means determines that the automatic transmission is not shifting, and the second determination means determines that the slip control is not being executed while the vehicle is decelerated by releasing the accelerator pedal, and the setting means sets the line pressure to a value higher than the second value if the first determination means determines that the automatic transmission is not shifting, and the second determination means determines that the slip control is being executed while the vehicle is decelerated by releasing the accelerator pedal.

* * * * *